(12) United States Patent
Kwon et al.

(10) Patent No.: US 9,460,115 B2
(45) Date of Patent: Oct. 4, 2016

(54) LOCATION-BASED DATA SERVICE APPARATUS AND METHOD

(75) Inventors: Soon-Sung Kwon, Gyeonnggi-do (KR); Cheol-Woo Park, Seoul (KR); Yu-Sun Kim, Seoul (KR); Hyun Mi Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 626 days.

(21) Appl. No.: 13/619,335

(22) Filed: Sep. 14, 2012

(65) Prior Publication Data

US 2013/0013635 A1 Jan. 10, 2013

Related U.S. Application Data

(63) Continuation-in-part of application No. 13/320,649, filed as application No. PCT/KR2010/003055 on May 14, 2010, now abandoned.

(30) Foreign Application Priority Data

May 15, 2009 (KR) .......................... 10-2009-0042401

(51) Int. Cl.
 *G06F 17/30* (2006.01)
(52) U.S. Cl.
 CPC .............................. *G06F 17/30241* (2013.01)

(58) Field of Classification Search
 CPC ................................................. G06F 17/30241
 USPC ............... 707/736, 706, 713, 722, 758, 781, 707/999.005; 340/932.2; 701/533
 See application file for complete search history.

(56) References Cited

U.S. PATENT DOCUMENTS

| | | | |
|---|---|---|---|
| 2004/0068433 A1 | 4/2004 | Chatterjee et al. | |
| 2007/0008181 A1* | 1/2007 | Rollert et al. | 340/932.2 |
| 2008/0288104 A1 | 11/2008 | Shani | |
| 2011/0093458 A1* | 4/2011 | Zheng et al. | 707/724 |
| 2012/0303272 A1* | 11/2012 | Studzinski | 701/450 |
| 2013/0245944 A1* | 9/2013 | Rutten et al. | 701/533 |

FOREIGN PATENT DOCUMENTS

| | | |
|---|---|---|
| JP | H11-312233 A | 11/1999 |
| JP | 2002-297654 A | 10/2002 |
| JP | 2002-340604 A | 11/2002 |
| JP | 2007-206608 A | 8/2007 |

* cited by examiner

*Primary Examiner* — Syling Yen
(74) *Attorney, Agent, or Firm* — Mintz Levin Cohn Ferris Glovsky and Popeo, P.C.; Peter F. Corless

(57) ABSTRACT

One aspect of the invention provides a method including: receiving shape information describing a shape of a first space of interest (SOI); receiving location information describing a location of the first SOI; associating the shape information with the location information and a first unique ID to form a first SOI object; receiving second information describing at least one of a shape or a location of a second SOI; associating the second information and a second unique ID to form a second SOI object; and associating the first SOI object with the second SOI object.

15 Claims, 10 Drawing Sheets

LOCATION-BASED DATA SERVICE APPARATUS AND METHOD

CROSS-REFERENCES TO RELATED APPLICATIONS

This application is a continuation-in-part under 35 U.S.C. §120 of U.S. patent application Ser. No. 13/320,649, filed Nov. 15, 2011, which is a national phase application under 35 U.S.C. §371 of International Application No. PCT/KR2010/003055, filed May 14, 2010, which claim priority to Korean Patent Application No. 10-2009-0042401, filed May 15, 2009. The entire content of each of the above-referenced patent applications is hereby incorporated by reference herein.

BACKGROUND OF THE INVENTION

1. Field of the Invention

The present invention relates to an apparatus and a method for a location based data service, and more particularly, to an apparatus and a method for a location based data service that provides a location based data service with respect to a location of interest.

2. Description of the Related Art

In general, a prior art location based data service uses a technique in which a predetermined point included in map information is set to coordinates (X, Y) and a one-to-one matched data of the coordinate is provided. The predetermined point indicates a name or trade name of a place of user's interest. The set coordinates are connected to point of interest (POI) information to provide a user desired data.

FIGS. 1 and 2 show a conventional method for a location based data service. Referring to FIGS. 1 and 2, the prior art method is described.

As shown in FIG. 1, in the conventional location based data service, when a user selects a certain area, map information of the selected area is provided. Next, when a predetermined point on the map information is selected, point of interest information associated with the predetermined point is provided. When a desired location based data is selected from the point of interest information provided, a corresponding data is provided.

Alternatively, as shown in FIG. 2, in the conventional location based data service, when the user selects a certain area, map information of the selected area is provided. Next, when a predetermined point on the map information is selected, a search window is provided and a desired location based data is extracted from a database based on word search.

According to the prior art described above, data is matched one-to-one with a point (coordinates) to be managed, and thus, when multiple location based data are required for the same location, multiple matching coordinates are needed as many as the number of the multiple location based data. In this case, precise selection of the wanted data by the user is difficult, and confusion can be created as to which information about the location is wanted because there are multiple data indicating the same wanted location expressed in different coordinates. Thus, in searching for a specific location, unnecessary time is consumed in conducting comparison between contents and position coordinates of the data.

In addition, in the prior art, various location based data indicating the same location, which is categorized by layer on an electronic map, is stored in a separate database, thereby requiring additional resources. Also, coordinate information such as, for example, the POI information is not cumulatively managed. Therefore, when the map information is updated, there is a need to compare existing location based content and new POI information that is changed to verify that the two are identical.

SUMMARY OF THE INVENTION

The present invention has been made in view of the above problems, and provides an apparatus and a method for location based data service, which can promptly and accurately provide various location based data desired by a user.

In addition, the present invention provides an apparatus and a method for location based data service that ease user's search and improve accuracy of a search result by classifying and managing the location based data according to a space structure thereof.

Further, the present invention provides an apparatus and a method for location based data service that provides an interface allowing a user as well as an operator to manage the location based data in a space-time structure, thereby increasing efficiency of the location based data. To achieve the above objectives, in accordance with an aspect of the present invention, an apparatus for location based data service, in which a location based data is provided to a user, comprises: a space of interest (SOI) graphic providing unit configured to provide graphic information needed for a location based data search; an SOI processing unit configured to generate SOI information that is structurally connected to a space of interest by using the graphic information provided from the SOI graphic providing unit and configured to generate the location based data by matching the generated SOI information with data information corresponding to the SOI information; and a location based data generation unit configured to manage the location based data generated by the SOI processing unit.

According to the present invention, instead of independently managing multiple points associated with the same space, an SOI defined by a user or an operator is generated as a representative management unit and a location based data in various forms corresponding to the SOI are structurally matched to the SOI, thereby enabling systematic management of the location based data.

Also, according to the present invention, a space of which information the user wants to search, a space actually selected by the user, and a space in which information is managed are all identical with one another so that the location based data can be promptly and accurately provided to the user.

Further, according to the present invention, an interface is provided to allow not only the operator but also the user can manage the location based data in a spatial structure, thereby increasing utility of the location based data. Also, the SOI information is cumulatively managed so that a history of the SOI information can be tracked even if the SOI information is changed.

Another aspect of the invention provides a method including: receiving shape information describing a shape of a first space of interest (SOI); receiving location information describing a location of the first SOI; associating the shape information with the location information and a first unique ID to form a first SOI object; receiving second information describing at least one of a shape or a location of a second SOI; associating the second information and a second unique ID to form a second SOI object; and associating the first SOI object with the second SOI object.

In one embodiment, associating the first SOI object with the second SOI object includes: associating the first SOI object and second SOI object in a vertical structure in which at least one of the first or second SOI object is located within the other of the first or second SOI object.

In another embodiment, associating the first SOI object with the second SOI object includes: associating the first SOI object and second SOI object in a horizontal structure in which the first and second SOI objects are located horizontally to one another.

In another embodiment, associating the first SOI object with the second SOI object includes: associating the first SOI object and second SOI object in a layered structure in which the first and second SOI object form layers within a third SOI object.

In another embodiment, associating the first SOI object with the second SOI object includes associating the first SOI object and second SOI object in combination of at least two of: a unit structure, a vertical structure, a horizontal structure, and a layered structure.

In another embodiment, the shape information comprises at least one of: a point, a line, an area, and a building.

The method can further include accepting changes to the shape information or the location information of the first SOI object. In another embodiment, the changes are user-initiated.

The method can include managing a history of changes of the shape information or the location information of the first SOI object.

The method can further include associating one or both of the first SOI object and the second SOI object with content information selected from a group consisting of: local information, building information, business information, phone number information, direction information, universal resource locator (URL) information, website information, personal information, and uniform commercial code (UCC) information.

Another aspect of the invention provides a method including: receiving first information describing at least one of a shape or a location of a first space of interest (SOI); associating the first information and a first unique ID to form a first SOI object; receiving second information describing at least one of a shape or a location of a second SOI; associating the second information and a second unique ID to form a second SOI object; and associating the first SOI object with the second SOI object by forming a relationship between the first unique ID and the second unique ID, the relationship being at least one of vertical, horizontal, and layered.

In one embodiment, the shape information comprises at least one of: a point, a line, an area, and a building.

The method can further include accepting user-initiated changes to the first information of the first SOI object.

The method can further include managing a history of changes of the first information of the first SOI object.

The method can further include associating one or both of the first SOI object and the second SOI object with content information selected from a group consisting of: local information, building information, business information, phone number information, direction information, universal resource locator (URL) information, website information, personal information, and uniform commercial code (UCC) information.

Another aspect of the invention provides a method including: receiving information describing at least one of a shape or a location of a space of interest (SOI); associating the information with a unique ID to form an SOI object; receiving content information; determining a relationship between the content information and the SOI object; and associating the SOI object with the content information based on the relationship.

In another embodiment, the content information comprises at least one of: local information, building information, business information, phone number information, direction information, universal resource locator (URL) information, website information, personal information, and uniform commercial code (UCC) information.

In another embodiment, associating the SOI object with the content information based on the relationship includes providing access to the SOI object and corresponding content information based on one or both of the content information and the SOI object.

The method can include: determining a selected SOI or selected content information; searching for particular SOI information corresponding to the selected SOI or selected content information; extracting content information according to the particular SOI information; and providing the extracted content information.

Another aspect of the invention provides an apparatus including: a processing unit; and a computer-readable medium configured to store program commands that when executed by the processing unit are operable to: receive shape information describing a shape of a first space of interest (SOI); receive location information describing a location of the first SOI; associate the shape information with the location information and a first unique ID to form a first SOI object; receive second information describing at least one of a shape or a location of a second SOI; associate the second information and a second unique ID to form a second SOI object; and associate the first SOI object with the second SOI object.

The apparatus can further include: a user interface configured to display the SOI object and content information.

In another embodiment, the program commands, when executed by the processing unit to associate the first SOI object with the second SOI object, are further operable to associate the first SOI object and second SOI object in a vertical structure in which at least one of the first or second SOI object is located within the other of the first or second SOI object.

In another embodiment, the program commands, when executed by the processing unit to associate the first SOI object with the second SOI object, are further operable to associating the first SOI object and second SOI object in a horizontal structure in which the first and second SOI objects are located horizontally to one another.

In another embodiment, the program commands, when executed by the processing unit to associate the first SOI object with the second SOI object, are further operable to associating the first SOI object and second SOI object in a layered structure in which the first and second SOI object form layers within a third SOI object.

In another embodiment, the program commands, when executed by the processing unit to associate the first SOI object with the second SOI object, are further operable to associate the first SOI object and second SOI object in combination of at least two of: a unit structure, a vertical structure, a horizontal structure, and a layered structure.

In another embodiment, the shape information comprises at least one of: a point, a line, an area, and a building.

In another embodiment, the program commands, when executed by the processing unit, are further operable to accept changes to the shape information or the location information of the first SOI object.

In another embodiment, the changes are user-initiated.

In another embodiment, the program commands, when executed by the processing unit, are further operable to manage a history of changes of the shape information or the location information of the first SOI object.

In another embodiment, the program commands, when executed by the processing unit, are further operable to associate one or both of the first SOI object and the second SOI object with content information selected from a group consisting of: local information, building information, business information, phone number information, direction information, universal resource locator (URL) information, website information, personal information, and uniform commercial code (UCC) information.

Another aspect of the invention provides an apparatus including: a processing unit; and a computer-readable medium configured to store program commands that when executed by the processing unit are operable to: receive first information describing at least one of a shape or a location of a first space of interest (SOI); associate the first information and a first unique ID to form a first SOI object; receive second information describing at least one of a shape or a location of a second SOI; associate the second information and a second unique ID to form a second SOI object; and associate the first SOI object with the second SOI object by forming a relationship between the first unique ID and the second unique ID, the relationship being at least one of vertical, horizontal, and layered.

In one embodiment, the shape information comprises at least one of: a point, a line, an area, and a building.

In another embodiment, the program commands, when executed by the processing unit, are further operable to accept user-initiated changes to the first information of the first SOI object.

In another embodiment, the program commands, when executed by the processing unit, are further operable to manage a history of changes of the first information of the first SOI object.

In another embodiment, the program commands, when executed by the processing unit, are further operable to associate one or both of the first SOI object and the second SOI object with content information selected from a group consisting of: local information, building information, business information, phone number information, direction information, universal resource locator (URL) information, website information, personal information, and uniform commercial code (UCC) information.

Another aspect of the invention provides an apparatus including: a processing unit; and a computer-readable medium configured to store program commands that when executed by the processing unit are operable to: receive information describing at least one of a shape or a location of a space of interest (SOI); associate the information with a unique ID to form an SOI object; receive content information; determine a relationship between the content information and the SOI object; and associate the SOI object with the content information based on the relationship.

In one embodiment, the content information comprises at least one of: local information, building information, business information, phone number information, direction information, universal resource locator (URL) information, website information, personal information, and uniform commercial code (UCC) information.

In another embodiment, the program commands, when executed by the processing unit to associate the SOI object with the content information based on the relationship, are further operable to provide access to the SOI object and corresponding content information based on one or both of the content information and the SOI object.

In another embodiment, the program commands, when executed by the processing unit, are further operable to: determine a selected SOI or selected content information; search for particular SOI information corresponding to the selected SOI or selected content information; extract content information according to the particular SOI information; and provide the extracted content information.

The apparatus can further include a user interface configured to display the SOI object and content information.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail.

Figure 1:
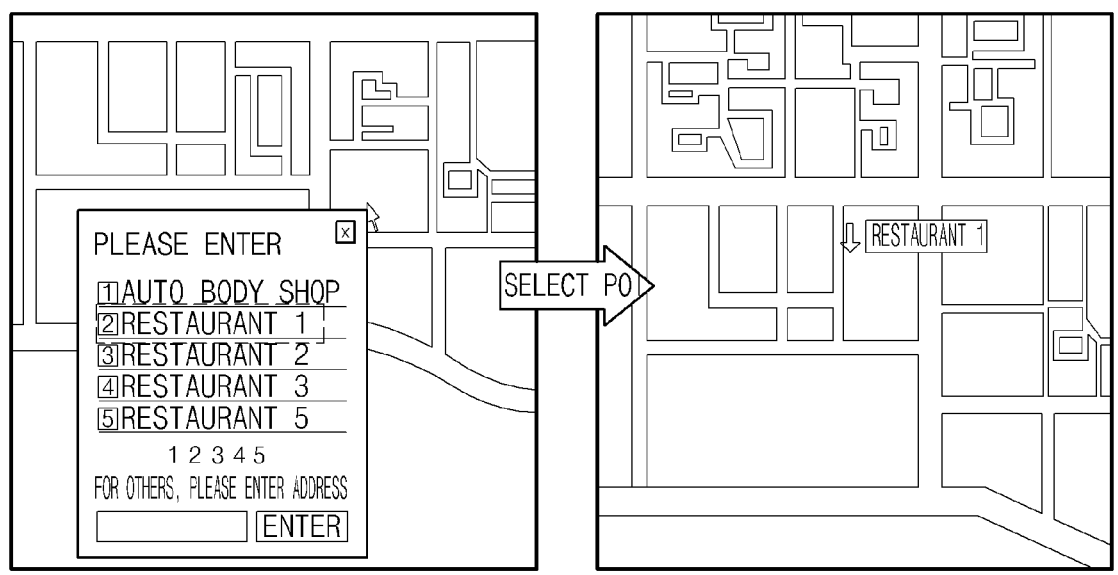
FIG. 1 illustrates an example method for a conventional location based data service.
Figure 2:
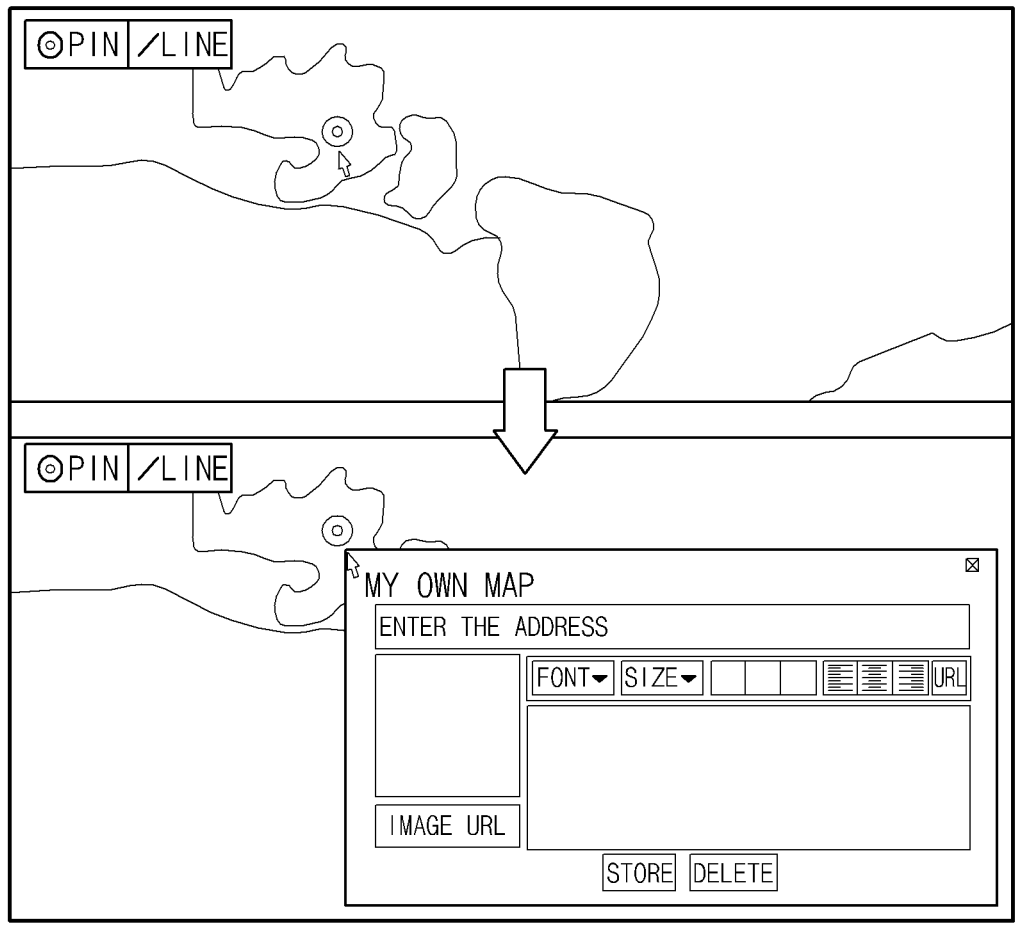
FIG. 2 illustrates another example method for a conventional location based data service.
Figure 3:
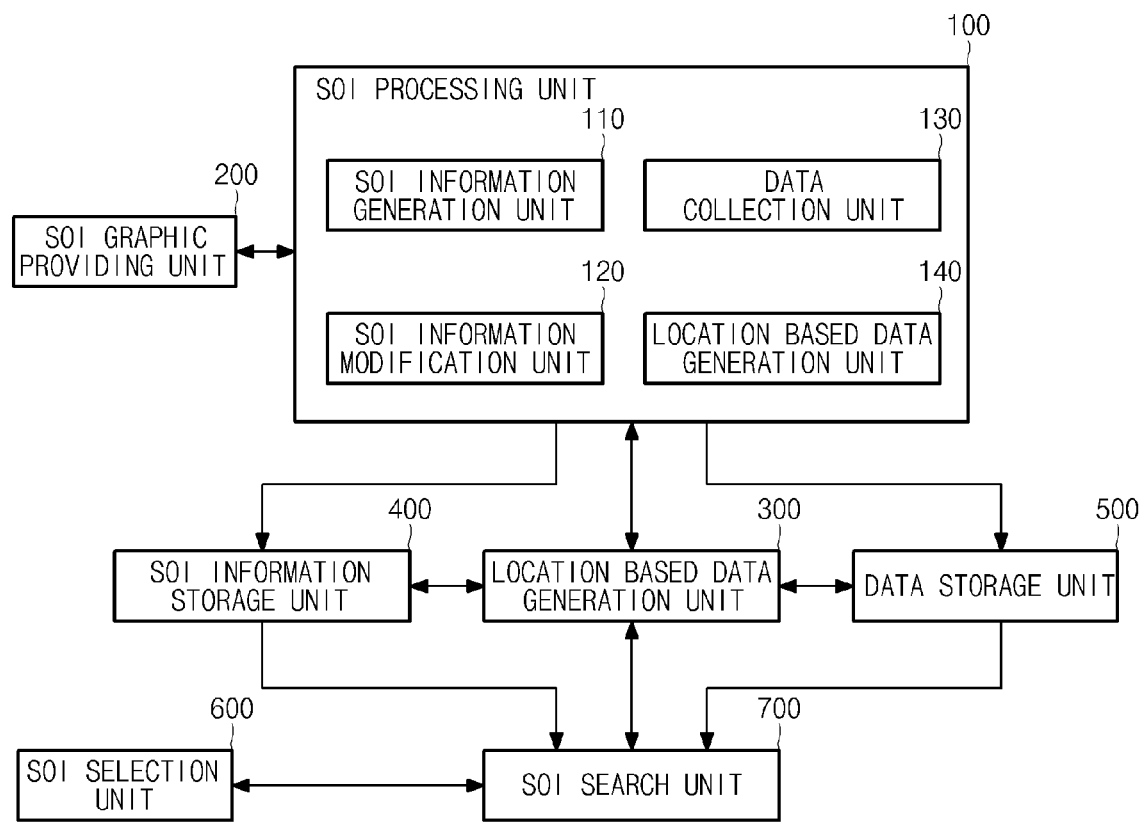
FIG. 3 is a configuration view illustrating an apparatus for a location based service according to an exemplary embodiment of the present invention.
Figure 4:
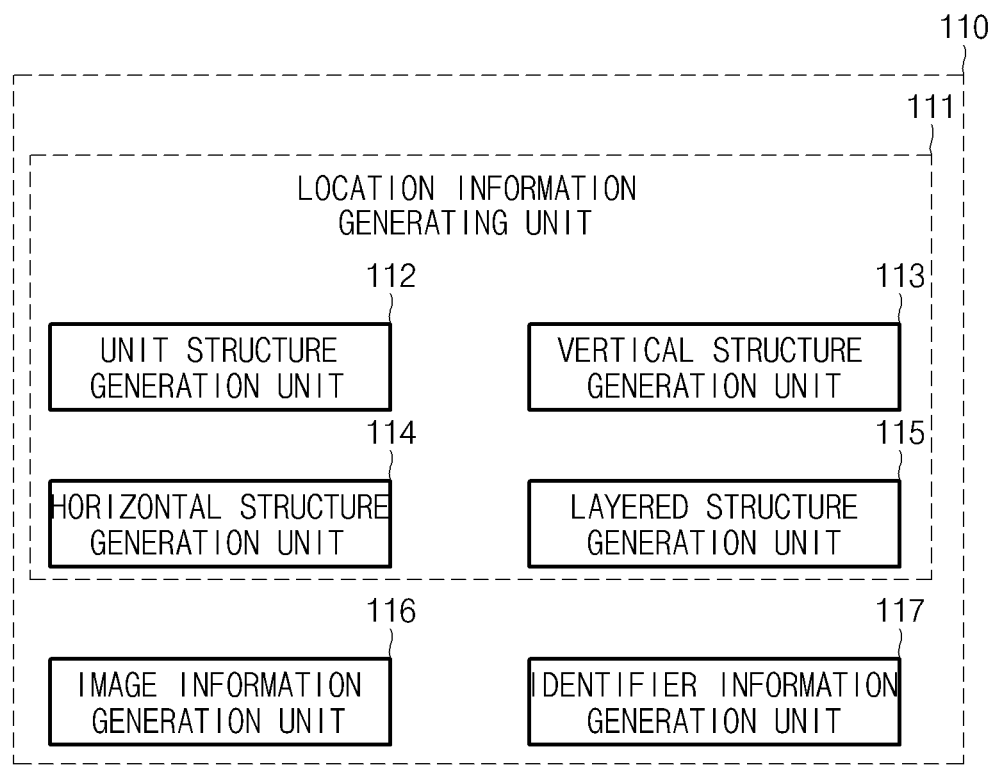
FIG. 4 is a detailed configuration view illustrating an SOI information generation unit of the apparatus for the location based data service FIG. 3.

FIG. 3 is a configuration view illustrating an apparatus for a location based service according to an exemplary embodiment of the present invention and FIG. 4 is a detailed configuration view illustrating a space of interest (SOI) information generation unit of the above apparatus for the location based data service. Referring to FIG. 3, the apparatus for the location based data service includes an SOI processing unit 100, an SOI graphic providing unit 200, a location based data generation unit 300, an SOI information storage unit 400, a data storage unit 500, an SOI selection unit 600, and an SOI search unit 700.

The SOI processing unit 100 generates a location based data in unit of SOI and manages or processes the location based data in the unit of SOI. Specifically, the SOI processing unit 100 includes an SOI information generation unit 110 for generating SOI information including, for example, location information, image information or SOI identifier information, an SOI information modification unit 120 for searching and modifying the location information, the image information or the SOI identifier information in the SOI information, a data collection unit 130 for collecting, for example, data information, and a location based data generation unit 140 for generating the location based data by connecting the data with the SOI information generated by the SOI information generation unit 110.

Referring to FIG. 4, the configuration of the SOI information generation unit 110 is described. The SOI information generation unit 110 includes a location information generation unit 111 for generating information such as location information, SOI structure information or SOI combination information, an image information generation unit 116 for generating image information such as dot, line, or zone information or building information that is to be displayed on the location information, and an identifier information generation unit 117 for generating and allocating identifier information to distinguish each SOI.

The SOI information generation unit 110 manages the location based data in the unit of SOI and cumulatively manages the location information, the image information or the SOI identifier information such that the location information, the image information or the SOI identifier information can be maintained even if modified or deleted over time.

The location information generation unit 111 generates the location information and generates and manages SOIs corresponding to the location information. Also, when the SOIs are generated to have a structure, the location information generation unit 111 manages structure information of the SOIs, and when the structures of the SOIs are combined, the location information generation unit 111 manages combination information thereof.

The location information generation unit 111 includes a unit structure generation unit 112 for generating and managing a single SOI, a vertical structure generation unit 113 for generating and managing a vertical structure of a plurality of SOIs such that the plurality of the SOIs are included in a single SOI, a horizontal structure generation unit 114 for generating and managing a horizontal structure of a plurality of SOIs such that the plurality of the SOIs are connected horizontally to one another, and a layered structure generation unit 115 for generating and managing a layered structure of a plurality of SOIs such that the plurality of the SOIs form at least one layer within a single SOI.

Figure 5:
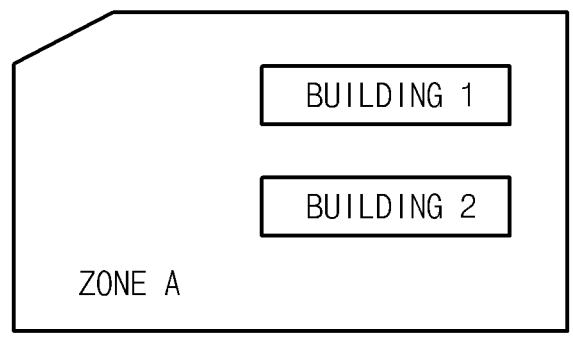
FIG. 5 illustrates an example embodiment in which SOIs have a vertical structure.

The vertical structure generation unit 113 generates SOIs in the vertical structure in which a single SOI has at least one lower SOI thereof such that at least one other location information is included within single location information. FIG. 5 shows an example embodiment in which SOIs have the vertical structure, and the SOI can be generated such that a building 1 and a building 2 are included within a zone A. The zone A is generated as a higher SOI and the building 1 and the building 2 are each managed as a lower SOI of a higher SOI, i.e., the zone A.

Figure 6:
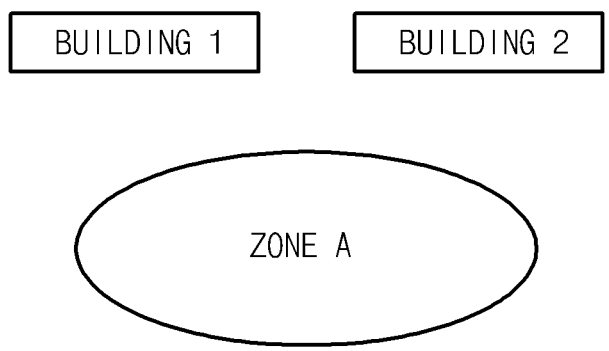
FIG. 6 illustrates an example embodiment in which SOIs have a horizontal structure.

The horizontal structure generation unit 114 generates the SOIs in the horizontal structure in which a plurality of SOIs are positioned horizontally, without a hierarchy. FIG. 6 shows an example embodiment in which SOIs are generated to have the horizontal structure, in which the zone A, the building 1, and the building 2 are connected to one another horizontally. Each of the zone A, the building 1, and the building 2 are generated as SOI and managed to be connected to one another.

Figure 7:
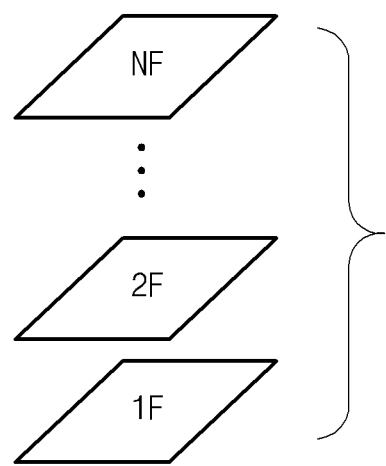
FIG. 7 illustrates an example embodiment in which SOIs have a layered structure.

The layered structure generation unit 115 generates and manages SOIs such that a plurality of SOIs form layers within a single SOI, i.e., a single area or building can include a plurality of layers therewithin. FIG. 7 shows an example embodiment in which the SOIs form the layered structure, in which multiple SOIs form layers within a single building 1. The building 1 is created as a higher SOI and each layer is defined as a lower SOI thereof, wherein each SOI is separately managed.

In addition, in one example embodiment of the present invention, the SOIs can be generated and managed in a spatial structure in which the vertical structure, the horizontal structure, and the layered structure are combined. For example, the zone A and a zone B can be created as SOIs in the horizontal structure, wherein the zone A includes the building 1 and the building 2, in the vertical structure, and the zone B includes a building 3 and a building 4, in the vertical structure, and the building 1 through building 4 can be created as SOIs in the layered structure to have multiple layers therewithin.

In addition, the SOIs can be generated and managed in a combination structure in which one of layers in the layered structure further includes the vertical structure and the horizontal structure.

Therefore, an apartment complex, an industrial complex, a tourist site, or a road can be generated in a single SOI, while lower SOIs thereof are generated in a combination of the vertical structure, the horizontal structure, or the layered structure so that a particular space can be managed as a unit. Also a plurality of location based data of the particular space can be provided to a user.

The image information generation unit 116, through the SOI graphic providing unit 200, generates image information, that is, a substantial image of point, line, area or building information displayed on the location information, wherein the image information is managed in the SOI unit. For example, the zone can be displayed as an image in the SOI unit, a building within the zone can be displayed as an image in the SOI unit, and the configuration of the building can be displayed as an image in the SOI unit.

The identifier information generation unit 117 can generate and manage the identifier information of the SOI generated by the location information generation unit 112 in a certain structure. When an SOI is generated, the identifier information generation unit 117 can allocate an SOI identifier number thereof so that information can be managed in the unit of SOI.

Referring now back to FIG. 3, when the location information, the image information, or the identifier information is changed, the SOI information modification unit 120 searches the SOI information generation unit 110 and modifies the corresponding information. The location information, the image information, or the SOI identifier information prior to change is cumulatively stored. Thus, the location information, the image information, or the SOI identifier information, which is cumulatively managed, are preserved even when the location information, the image information, or the SOI identifier information is changed or deleted over time.

The data collection unit 130 collects information of data, created by the operator or the user, and URL information of data, which exists independently of the apparatus according to the present invention, and provide the collected information to the location based data generation unit 140.

The location based data generation unit 140 generates the location based data in the SOI unit by matching the SOI provided from the SOI information generation unit 110 and data information provided from the data collection unit 130. Thus, the SOI including the corresponding location based data can be accessed based on the data information, and the location based data connected to the corresponding SOI can be accessed through the SOI. The location based data includes various data such as, for example, local information, building information, business information, phone number information, direction information, URL information, website information, personal information, or UCC.

The SOI graphic providing unit 200 provides graphic information to the SOI processing unit 100 and provides the user with a graphic interface, which is related to, for example, the map information or the image information that can be used for a user's search.

The location based data generation unit 300 manages the location based data generated by the SOI processing unit 100. The location based data generation unit 300 can manage integrated SOI information and data information included in the location based data, or can separately manage the SOI information and the data information that matches to the SOI information. In addition, when the SOI information contained in the location based data is changed, the location based data management unit 300 manages a history of changes so that a corresponding location based data can be continuously managed regardless of the change in the SOI information. In addition, by cumulatively managing the SOI information and the data information, the change in the location based data according to a lapse of time can be identified. Also, in response to a request from the SOI search unit 700, the SOI information and the data information matching with the SOI information included in the location based data can be extracted and provided.

The SOI information storage unit 400 stores the SOI information, which is generated by the SOI processing unit 100 and matches to a corresponding data. The SOI information storage unit 400 stores the SOI information according to the SOI structure thereof and provides the corresponding SOI information in response to the request from the SOI search unit 700. In addition, the SOI information storage unit 400 cumulatively stores and manages the SOI information that changes.

The data storage unit 500 stores the data information matched to the SOI information according to the structure thereof. The data may be information generated by the user and the operator or information of an external data that exists independently of the apparatus. When the data is an independent external data, the data can be information of URL at which the corresponding data can be located.

The SOI selection unit 600 provides an SOI based user interface for use in a user's search for the location based data. Therefore, a selection window is provided based on graphic information provided from the SOI graphic providing unit 200, to allow the user to select the SOI information or the data information. When the user selects the SOI information or the data information to be searched from the selection window, the corresponding SOI information or the data information is provided from the SOI information search unit 700.

The SOI search unit 700 can request the location based data generation unit 300 to extract the SOI information or the data information selected by the SOI selection unit 600. When the SOI storage unit 400 or the data storage unit 500 is designed to include the location based data therein, the SOI search unit 700 can directly request the SOI storage unit 400 and the data storage unit 500 for the selected SOI information and the data information.

According to example embodiments of the present invention, the user as well as the operator can directly generate the SOI information and the data information connected thereto. For example, the user can directly create the location based data by generating the image information on the map information, generating a three-dimensional SOI structure according to the image information, and generating a data corresponding to the SOI.

Figure 8:
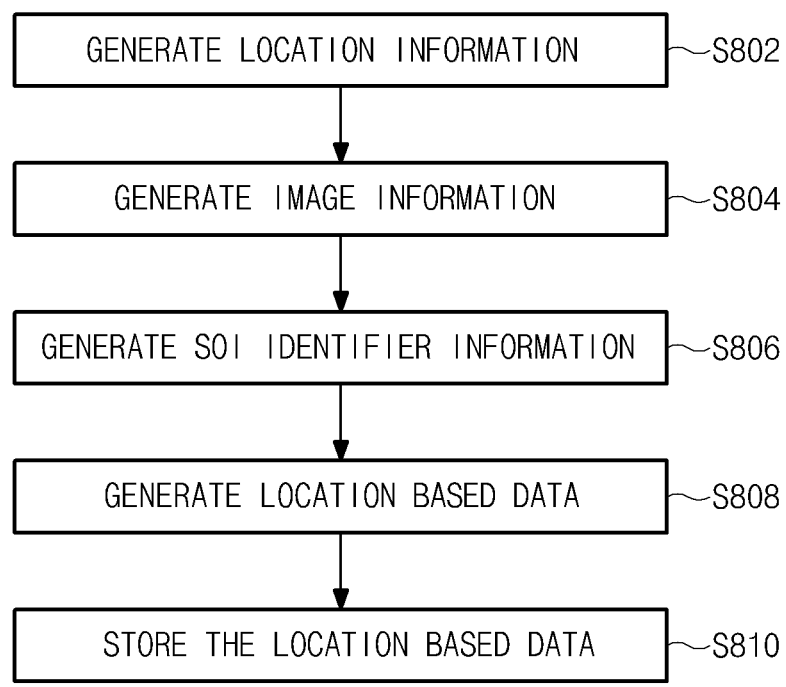
FIG. 8 is a flowchart diagram illustrating a method of generating a location based data according to an exemplary embodiment of the present invention.

FIG. 8 is a flowchart diagram illustrating a method of generating location based data according to an exemplary embodiment of the present invention. With reference to FIG. 8, the method of generating the location based data according to the present invention is described.

Referring to FIG. 8, the location information and the image information is generated (S802, S804). The location information can be location information of a single SOI or location information of a lower SOI that belongs to a single SOI. The information of the lower SOI can be configured, for example, in the horizontal structure, the vertical structure, or the layered structure. The image information can be information of an image of, for example, a point, a line, an area or a building that corresponds to the location information, which is implemented in a graphic fashion.

An order of generating the location information and the image information is not defined. In real applications, when the location information and the image information need to be created, the location information and the image information can be generated in any order. For example, one SOI can be generated on the map information and the image information thereof can be subsequently generated. In contrast, the image information such as a point, a line, an area or a building can be first created within an image created for an SOI and a lower SOI corresponding to the image information can be generated.

Next, the SOI identifier information corresponding to the location information and the image information can be generated (S806), and the location based data can be created by matching the SOI information and the data information (S808). Therefore, the location based data in various structures can be provided in connection with the location information of a certain space.

Next, the generated location based data is divided into the SOI information and the data information to be stored and managed (S810).

Figure 9:
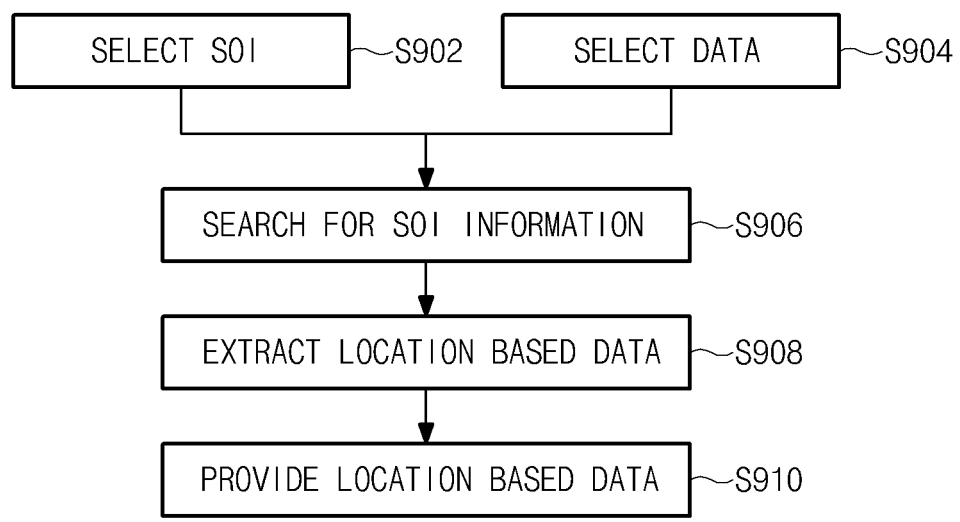
FIG. 9 is a flowchart diagram illustrating a method of providing location based data service according to another exemplary embodiment of the present invention.
Figure 10:
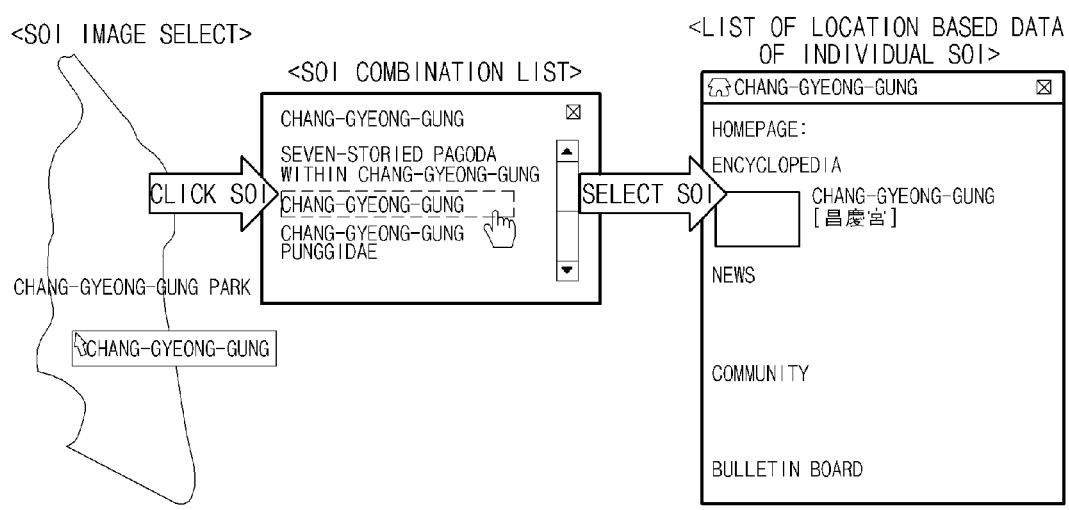
FIG. 10 is a view for further explaining a method of providing location based data service according to the another exemplary embodiment of the present invention.

FIG. 9 is a flowchart diagram illustrating a method of providing location based data service according to another exemplary embodiment of the present invention and FIG. 10 is a view for further explaining a method of providing location based data service according to the another exemplary embodiment of the present invention. Referring to FIGS. 9 and 10, a method of providing location based data service according to the present invention is described.

First, referring to FIG. 9, when the user selects location information to be searched on the map information provided to the user (S902), the SOI corresponding to the selected location information is selected and a search on the corresponding SOI information is performed (S904). Alternatively, according to the example embodiment of the present invention, accessing the SOI information based on the location based data is also possible. Therefore, when the user directly selects the data connected to the SOI, it is possible to search upper or lower SOI information connected to the corresponding data (S906). When the corresponding SOI has lower SOIs, the SOI information is continuously searched for and provided to the user.

When the selected SOI is the lowest SOI, the location based data that matches to the corresponding SOIs is extracted (S908) and the extracted location based data is provide (S910). The location based data includes the SOI information and the data information.

Also, as shown in FIG. 10, when particular location information of a space such as Palace Chang-gyeong-gung, the SOI information regarding lower SOIs structurally connected to the selected location information such as, for example, an octagonal seven storied pagoda within Changgyeong-gung, Changgyeonggung, Changgyeonggung Punggidae is provided. Also, the user is again provided with further lower SOIs structurally connected to the lower SOIs and subsequently the lowest SOIs such as encyclopedias, news, or community. When the lowest SOIs are provided, the location based data that matches to the lowest SOIs is provided.

The method of generating the location based data and the method of providing the location based data service, as described above, may be implemented in a form of a program command executable by various computer means and recorded in a computer readable recording medium. The computer readable recording medium may include program commands, data files, data structures, or the like, alone or a combination thereof. The program commands of the computer readable recording medium may be designed and configured specially for the sake of the present invention, or may be of the kind well-known and readily available to those skilled in the computer software field.

Examples of the computer readable recording medium include magnetic media such as hard disks, floppy disks and magnetic tapes, optical media such as CD-ROMs and DVDs, magneto-optical media such as floptical disks, and hardware devices such as ROMs, RAMs, and flash memories that are configured specially to store and execute program commands. Meanwhile, the recording medium can be a ray of light including a carrier wave, a metal wire or a waveguide that transmits a signal indicating a program command or a data structure.

In addition, the program commands include machine language codes created by a compiler as well as high-level language codes executable by a computer using, for example, interpreters. The hardware devices described above can be configured to operate as at least one software module to perform the operation of the present invention.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of operating a computing device comprising a processing unit, the method comprising:
  receiving, at a processing unit, shape information describing a shape of a first space or interest (SOI);
  receiving, at the processing unit, location information describing a location of the first SOI;
  generating, by the processing unit, a first location-based data structure associating the shape information with the location information and a first unique ID to form a first SOI object;
  receiving, at the processing unit, second information describing at least one of a shape or a location of a second SOI;
  generating, by the processing unit, a second location-based data structure associating the second information and a second unique ID to form a second SOI object;
  identifying, by the processing unit, a structure that includes the first and second SOI objects, wherein the structure is at least one of: a vertical structure in which one of the first and second SOI objects is located within the other of the first and second SOI objects and the first and second SOI objects are located vertically with respect to one another, a horizontal structure in which the first and second SOI objects are located horizontally with respect to one another, a layered structure in which the first and second SOI objects form layers within a third SOI object, and a unit structure in which the first and second SOI objects represent units of the third SOI object; and
  generating, by the processing unit, a third location-based data structure indicative of the indentified structure that includes the first and second SOI objects to associate the first SOI object with the second SOI object,
  wherein the third location-based data structure is generated and managed, by the processing unit, separately from the first and second SOI objects.

2. The method as in claim 1, wherein the structure that includes the first and second SOI objects includes a combination of at least two of: the unit structure, the vertical structure, the horizontal structure, and the layered structure.

3. The method as in claim 1, wherein the shape information comprises at least one of: a point, a line, an area, and a building.

4. The method as in claim 1, further comprising:
accepting changes to the shape information or the location information of the first SOI object.

5. The method as in claim 4, wherein the changes are user-initiated.

6. The method as in claim 1, further comprising:
managing a history of changes of the shape information or the location information of the first SOI object.

7. The method as in claim 1, wherein:
the third location-based data structure associates one or both of the first SOI object and the second SOI object with location-based data information selected from a group consisting of: local information, building information, business information, phone number information, direction information, universal resource locator (URL) information, website information, personal information, and uniform commercial code (UCC) information.

8. An apparatus, comprising:
a processing unit; and
a computer-readable medium configured to store program commands that when executed by the processing unit:
  receive shape information describing a shape of a first space of interest (SOI);
  receive location information describing a location of the first SOI;
  generate a first location-based data structure associating the shape information with the location information and a first unique ID to form a first SOI object;
  receive second information describing at least one of a shape or a location of a second SOI;
  generate a second location-based data structure associating the second information and a second unique ID to form a second SOI object;
  identify a structure that includes the first and second SOI objects, wherein the structure is at least one of: a vertical structure in which one of the first and second SOI objects is located within the other of the first and second SOI objects and the first and second SOI objects are located vertically with respect to one another, a horizontal structure in which the first and second SOI objects are located horizontally with respect to one another, a layered structure in which the first and second SOI objects form layers within a third SOI object, and a unit structure in which the first and second SOI objects represent units of the third SOI object; and generate a third location-based data structure indicative of the identified structure that includes the first and second SOI objects to associate the first SOI object with the second SOI object, wherein the third location-based data structure is generated and managed, by the processing unit, separately from the first and second SOI objects.

9. The apparatus as in claim 8, further comprising:
a user interface configured to display the SOI object and location-based data information.

10. The apparatus as in claim 8, wherein the structure that includes the first and second SOI objects includes combination of at least two of: the unit structure, the vertical structure, the horizontal structure, and the layered structure.

11. The apparatus as in claim 8, wherein the shape information comprises at least one of: a point, a line, an area, and a building.

12. The apparatus as in claim 8, wherein the program commands, when executed by the processing unit:
accept changes to the shape information or the location information of the first SOI object.

13. The apparatus as in claim 12, wherein the changes are user-initiated.

14. The apparatus as in claim 8, wherein the program commands, when executed by the processing unit:
manage a history of changes of the shape information or the location information of the first SOI object.

15. The apparatus as in claim 8, wherein:
the third location-based data structure associates one or both of the first SOI object and the second SOI object with location-based data information selected from a group consisting of: local information, building information, business information, phone number information, direction information, universal resource locator (URL) information, website information, personal information, and uniform commercial code (UCC) information.

* * * * *